United States Patent [19]

Höge

[11] 3,922,505

[45] Nov. 25, 1975

[54] ECHO CANCELLER

[75] Inventor: Harald Höge, Munich, Germany

[73] Assignee: Siemens Aktiengesellschaft, Berlin & Munich, Germany

[22] Filed: Aug. 9, 1973

[21] Appl. No.: 387,123

[30] Foreign Application Priority Data

| | | |
|---|---|---|
| July 6, 1973 | Germany | 2334546 |
| Aug. 10, 1972 | Germany | 2239440 |
| Aug. 10, 1972 | Germany | 2239452 |

[52] U.S. Cl. .............................................. 179/170.2
[51] Int. Cl.² ............................................ H04B 3/20
[58] Field of Search ............ 179/170.2, 170.6, 170.8

[56] References Cited

UNITED STATES PATENTS

| | | | |
|---|---|---|---|
| 3,500,000 | 3/1970 | Kelly, Jr. et al. | 179/170.2 |
| 3,508,017 | 4/1970 | Unrue, Jr. et al. | 179/170.2 |
| 3,632,905 | 1/1972 | Thomas et al. | 179/170.2 |
| 3,647,992 | 3/1972 | Thomas | 179/170.2 |
| 3,735,055 | 5/1973 | Thomas | 179/170.2 |
| 3,754,105 | 8/1973 | Poschenrieder et al. | 179/170.2 |

*Primary Examiner*—Kathleen H. Claffy
*Assistant Examiner*—Randall P. Mye s
*Attorney, Agent, or Firm*—Hill, Gros. , Simpson, Van Santen, Steadman, Chiara & Simpson

[57] ABSTRACT

An echo canceller for a long-distance telephone circuit comprising a hybrid whereby a branch network supplied by the signals of the incoming direction of the four-wire path is provided with a number of outputs which correspond to systems having pulse responses which are linearly independent from each other provides output signals which are directed by way of gain elements to an adder whose output signal is subtracted as a simulated echo signal from the signals of the outgoing direction of the four-wire path. Each gain element can be adjusted by the integrated output signal of a multiplying arrangement which multiplies the respective output signal of the branch network with the remaining echo signal which is being weighted with one or several weighting factors in the outgoing direction of the four-wire path. A control arrangement is fed by the output signals of the branch network and the remaining echo signal, the control arrangement controlling the weighting factor or factors in such a way that the weighting factors normally accept the maximum value and are attenuated in case of the occurrence of interfering noise in the outgoing direction of the four-wire path greater the stronger the interfering noise and the better the already achieved setting accuracy of the gain elements, such as for example in the case of the occurrence of speech signals of the near-end subscriber.

2 Claims, 6 Drawing Figures

ECHO CANCELLER

BACKGROUND OF THE INVENTION

1. Field of the Invention

This invention relates to an echo canceller, and more particularly to an echo canceller for a long-distance telephone circuit which comprises a two-wire/four-wire hybrid, wherein a branch network fed by the signals of the incoming direction of the four-wire path having a number of outputs is provided which corresponds to systems having pulse responses which are linearly independent from each other.

More specifically, the invention relates to such a system in which the output signals of the branch network are directed to an adder by way of a respective gain element whereby the output signal of the adder is added as a simulated echo signal, in the subtracting sense, to the signals of the outgoing direction of the four-wire path. Each gain element can be adjusted by the integrated output signal of an arrangement which multiplies the respective output signal of the branch network with the remaining echo signal which is attenuated with one or several weighting factors in the outgoing direction of four-wire path.

2. Description of the Prior Art

An echo canceller of the type mentioned above wherein a weighting takes place through the utilization of an unchangeable weighting factor is known in the art from, for example, the article "An Adaptive Echo Canceller" by M. M. Sondhi, published in "The Bell System Technical Journal", 1967, pages 497–511. Since, however, dialing noise and the speech signals of the near subscriber will at times render the outgoing signals of the four-wire path largely useless for a correlation process and can result in the fact that a good adjustment of the gain elements which was achieved in the meantime is lost, and the known echo cancellers mostly only achieve very little setting accuracy, which in addition can only be achieved after an extended period of time, since the setting speed must be kept within moderate boundaries because of the previously mentioned interferences.

SUMMARY OF THE INVENTION

It is the primary object of the present invention to provide an echo canceller of the previously mentioned type which displays a better converging setting behavior than prior known echo cancellers.

According to the invention, an echo canceller is characterized by a control arrangement which is fed by the output signals of the branch network and the remaining echo signal, whereby this control arrangement controls the weighting factor, or weighting factors, respectively, in such a way that the weighting factors normally accept maximum values and are more greatly reduced in the outgoing direction of the four-wire path the larger the interference noise and the more accurate the setting of the gain elements, such as, for example, in the case of the occurrence of speech signals of the near subscriber.

By means of the aforementioned measures, the most favorable setting speed for each given operational condition of the echo canceller can be achieved so that in case of major deviations from the optimum setting a satisfactory condition can be achieved in a very short time; however, also in case of unfavorable operational conditions, such as for instance continuous double talking or data transmission, the echo canceller reaches its optimum setting in a comparatively short time.

According to a further development of the invention, a first preferred embodiment comprises a control arrangement which is fed by the summation signal of the squared output signals of the branch network and creates a single weighting factor. In addition, this embodiment is preferably constructed in accordance with digital techniques in such a way that the branch network delivers its output signals digitally and sequentially in time as multiplex signals from which the simulated echo signal is created digitally, and that for the control arrangement for the creation of the weighting factor the summation signal of the squared output signals of the branch network and the remaining echo signal are always supplied in a power-of-two code. Accordingly, it is advantageously provided that the individual components and the setting means can be realized with comparatively little effort and can provide a high operational speed.

A second preferred embodiment of the invention is characterized in that each of the multiplying arrangements forms the sum of the output signals of the number of multipliers which are assigned to a respective output of the branch network whereby each multiplier multiplies the respective output signal of the branch network with a remaining echo signal and with a weighting factor created by a control arrangement, the control arrangement being supplied with the output signals of the branch network and the squared remaining echo signal. By these measures, the information of the signals of the incoming and outgoing directions of the four-wire path can be better utilized and provide the advantage that for each given operational condition of the echo canceller the most favorable setting speed can be achieved, so that in case of major deviations from the optimum adjustment a satisfactory condition may be attained within a very short time.

BRIEF DESCRIPTION OF THE DRAWINGS

Other objects, features and advantages of the invention, its organization, construction and operation will be best understood from the following detailed description of preferred embodiments of the invention taken in conjunction with the accompanying drawings on which.

DESCRIPTION OF THE PREFERRED EMBODIMENT

Figure 1:
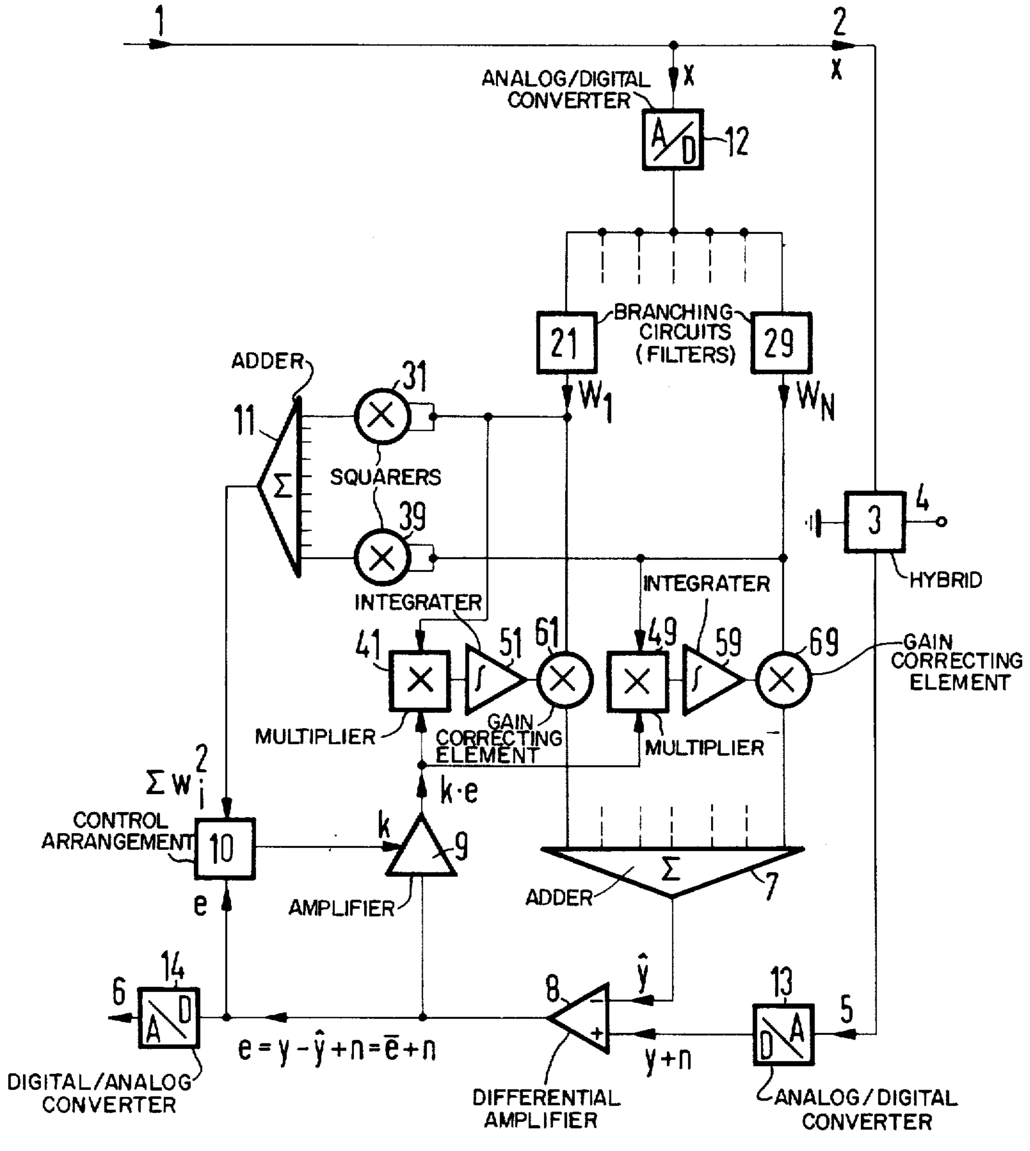
FIG. 1 is a schematic diagram of a first exemplary embodiment of the invention arranged a two-wire path and a four-wire path of a long-distance telephone circuit.

Referring to FIG. 1, a section from a long-distance telephone circuit containing one or several four-wire paths producing time delays, the circuit including an incoming direction four-wire path referenced 1, 2, an outgoing direction four-wire path referenced 5, 6 and a two-wire path referenced 4. The connection between these paths being effected by way of a hybrid 3 which is equipped with a balance network. The echo canceller is switched on in the incoming direction 1, 2 on the one hand and in the outgoing direction 5, 6 on the other hand; whereby, however, a longer four-wire path may be located between this echo canceller and the hybrid connection 3.

An adaptive four-pole circuit of the echo canceller comprises, for example, a filter bank comprising a large amount N of filters 21 . . . 29 which are connected in parallel on their input sides, and a plurality of gain elements 61 . . . 69 connected to the outputs of the respective filters and to a subsequent adder 7. The input of this four-pole circuit is supplied from the signal of the incoming direction 1, 2; the output of the four-pole circuit supplies a simulated echo signal $\hat{y}$ by way of a differential amplifier 8, in the substractive sense, into the outgoing direction 5, 6. In a correctly adjusted condition, the four-pole circuit fulfills approximately the same transmission function as that of the echo path from the input of the four-pole circuit by way of the branch hybrid 3 back to the differential amplifier 8 so that the output of the differential amplifier 8 an extensive cancellation of the echo y which was received by way of the hybrid 3 will take place. The speech signal originating from the near subscriber, who is connected to the hybrid 3 by way of the two-wire path 4, appears in the outgoing path 5 of the four-wire path as a signal $n$. The signal $e$ at the output of the differential amplifier 8 therefore amounts to $$e = y - \hat{y} + n = \bar{e} + n.$$

The most favorable conditions for adjusting the gain elements 61 . . . 69 by means of correlators which will be described below result during the use of a branching network which contains systems having orthogonal pulse responses. Such a branch network can be realized, as in the present example, by the filters 21 . . . 29 which are connected parallel on their input sides, but, for example, also by a delay element comprising a larger number of tappings (compare Sondhi, FIG. 2) or by Laguerre networks (compare Sondhi, Page 506). However, generally the condition demanding that the pulse responses of the filters be linearly independent from each other will be sufficient.

The individual output signals $w_1 \ldots w_N$ are created in the arrangement according to FIG. 1 by the outputs of the branch network at the filters 21 . . . 29 and are comprised, after passing respective gain elements 61 . . . 69, by the adder 7 into the simulated echo signal $\hat{y}$. Since the gain element 61 . . . 69 each have an adjustable amplification factor $c_1 \ldots c_N$ which may be larger or smaller than 0, the estimated or simulated echo signal $\hat{y}$ at the output of the adder 7 will result in $$Y = \sum_{i=1}^{i=N} C_i \cdot W_i$$

The adjustment of the amplification of the gain elements 61 . . . 69 takes place in each case in response to the integrated output signal of the respective multiplier. Each of these multipliers 41 . . . 49 is controlled, on the one hand, by the respective output signal of the branch network 21 . . . 29, and, on the other hand, by the remaining echo signal e amplified by the factor k in the outgoing direction 6 of the four-wire path. An output signal $k \cdot e \cdot w_i$ of each of the multipliers which constitutes the product of the weighted remaining signal ke with the corresponding output signal $w_i$ of the branch network then controls, by way of the subsequently connected integrator elements 51 . . . 59, the amplifications $c_i$ of the respective correcting member.

The remaining echo signal $e$ is fed to the multipliers 41 . . . 49, being multiplied by the weighting factor $k$. For this purpose, an amplifier 9 is connected into the feed line between the output of the differential amplifier 8 and the multipliers 41 . . . 49, the amplifier 9 having its amplification $k$ controlled by the control arrangement 10. The control arrangement 10 is also supplied with the remaining echo signal $e$ and in addition with the signal of the sum of the squares of the signals $w_i$ by an adder 11 which has the number of inputs $N$, whereby each input is connected by way of one of the squarers 31 . . . 39 with respective outputs of the circuits 21 . . . 29. The control arrangement 10 controls the weighting factor $k$ in dependency on the remaining echo $e$ and from the summation of the squared output signals of the branch network in such a way that the weighting factor $k$ normally takes a maximum value and is reduced in case of the occurrence of interfering noise $n$ in the outgoing direction of the four-wire path 5, 6 the larger the interfering noise $n$ and the better the setting accuracy of the gain elements 61 . . . 69 already achieved. The interfering noise $n$ may be, for example, composed of speech signals of the near-end subscriber connected to the two-wire path 4, but may also be signals of a data transmission originating from the near-end subscriber.

By the above described type of control of the weighting factor $k$ dependent on the remaining echo signal $e$ and the sum of the squared output signals of the branch network, the most favorable setting speed for each following operational condition of the echo canceller can be achieved so that in case of major deviations from the optimum adjustment a satisfactory condition can be attained within a very short time; however, also in case of unfavorable operational conditions, such as for example, continuous double talking or in case of data transmission, the echo canceller will find its optimum setting within a comparatively short time.

For a better understanding of the operation of the echo canceller, the above is referred to as canceller operating with analog signals. Actually, the arrangement according to FIG. 1, however, illustrates an echo canceller operating with digital signals and thus receiving the signal $x$ via the analog/digital converter 12 from the incoming direction four-wire path 1, 2. Furthermore, the signals $y + n$ of the outgoing direction four-wire path 5 reach the differential amplifier 8 by way of an analog/digital converter 13. These output signals constitute the remaining echo signals e which leave the digital/analog converter 14 in the outgoing direction at 6. For this digital operational mode, the branching circuits 21 . . . 29 can be realized, for example, as a shift register 20 which will be explained below with reference to FIG. 3. The control arrangement 10 processes the output signals $w_1(t_m) \ldots w_N(t_m)$ by way of the adder 11 and the squarers 31 . . . 39 at sampling times $t_m(m=0,1,2,\ldots)$ and the remaining echo signal $e(t_m)$ with iteration steps $m$.

In the following paragraphs, by means of the diagram illustrated in FIG. 2, the method for the determination of the weighting factor k from the remaining echo signal e and the summarion $$\sum^{2} w_i$$

of the squared output signals of the branch network will be explained in detail. By way of the quotient former 71 by weighting the outputs of the branch network by the number N of the signal $$a_m = \sum_{i=1}^{N} w_i^2/N$$

is formed during the iteration $m$, whereby this signal forms an estimated value for the medium power of the input signal $x$. Thereafter, the signal $a$ is multiplied by the multiplier 72 with the value $r_m$ which was calculated in the previous iteration $m-1$. The magnitude $r_m$ constitutes a measurement for the setting accuracy of the gain elements 61 . . . 69 already achieved.

Thereafter, with the assistance of the multipliers 73 and 76 and the subtracters 74 and 75, as well as the adder 77, the quantity $Z_m$ is formed from the quantities $e(t_m)$, $a_m$, $r_m$, $f$ and $S_m$ whereby $e(t_m)$ constitutes the sampled value of the remaining echo signal $e$ which occurs at the sampling time $t_m$. The quantity $a_m r_m$ is merely an estimated value for the power of the remaining echo $\tilde{e}$ and the magnitude $e^2 - a_m r_m$ formed therefrom is an estimated value for the instantaneous power of interfering signal $n$ (for example in case of double talking). The quantity $S_m$ is the measure obtained in the previous iteration $m-1$ for the average power of the interfering signal n.

$Z_m$ constitutes an estimated power of the interfering signal $n$ which was averaged over several steps, whereby the number of the steps by way of which $Z_m$ is averaged can be determined by the constant $f$. It is advisable to select approximately $f=0.2$ corresponding to an average of $Z_m$ over five steps; however, the constant $f$ can be basically freely selected between a value larger than zero and the value one. $Z_m$ results in the relationship $$Z_m = S_m + f\,[e^2(t_m) - a_m r_m - S_m],\ 0<f\leq 1$$

The relation "$Z_m<0$" is questioned in the comparator 79, i.e., whether a negative value results for $Z_m$. In this case, there is an incorrect estimate since a power always must be positive and the new $S_{m+1}=0$ is directed to the store 84 which contains the value for $S_m$. If the condition $Z_m<0$ is not fulfilled the second comparator 80 is activated and is interrogated for the condition $Z_m > S_m \cdot SW$, whereby the value $SW \cdot S_m$ is formed by way of the multiplier 78. The magnitude SW is a threshold value and is to be selected to be larger than one. In case of the decision that the value $Z_m$ (or in another embodiment which is not illustrated in detail the magnitude $e_m^2 - a_m r_m - S_m$) is substantially larger (threshold value SW) than the previous estimate $S_m$ there is an indication that during the conversation a transition from "no double talking" to "double talking" exists, and consequently the value $S_m$ is no longer determined by the average value $Z_m$, but by the estimated instantaneous value $e_m^2 - a_m r_m$ of the signal power of the near-end subscriber, the latter being realized by closing of the switch 82 which assigns the value $e_m^2 - a_m r_m$ to the store 84. In case of the exclusive speaking of the far-end subscriber, or in case of continuous double-talking, the decision element 80 makes the no-decision, so that the store 84 stores the value $Z_m$ by way of the switch 83, this value corresponding to the equation $S_{m+1} = Z_m$.

Generally, therefore, the estimated value $S_{m+1}$ for the medium power of the signal of the near end is determined by the equation $$S_{m+1} = \begin{cases} O & \text{for } Z_m > O \\ 3_m^2 - a_m r_m & \text{for } Z_m > SW.S_m,\ SW \geq 1 \\ Z_m & \text{for usual} \end{cases}$$

It may also be advantageous, for reasons of easier instrumentation, as was mentioned above, to indicate double talking, whereby $S_{m+1} = e_m^2 - a_m r_m$ is given by the relation $$e_m^2 - a_m r_m - S_m > SW \cdot S_m.$$

With the multipliers 86 and 87, the adder 85 and the divider 88 form the magnitudes $r_m$, $a_m r_m$, $S_{m+1}$ as well as the constants $N$ and $b$ according to the calculation of $S_{m+1}$, and the weighting factor $k$ for the iteration $m+1$ is determined by the equation $$k_{m+1} = b \cdot r_m / (N \cdot (r_m a_m + S_{m+1})),\ 0<b \leq 1$$

and the amplifier 9 is adjusted to this new weighting factor $k_{m+1}$. The constant $b$ must be in the region $0<b\leq 1$. For an optimum setting speed of the correcting element 61 . . . 69, the most favorable value of the constant $b$ depends on the type and statistics of the signals which are to be transmitted by the echo canceller and lies, for speech, at approximately $b=0.9$ and for digital signals or white noise at $b=1$, respectively.

The value $r_{m+1}$ is calculated in accordance with the relationship $$r_{m+1} = r_m - c \cdot k_{m+1} \cdot a_m r_m + d <0 \leq c\ 1\ d \geq 0$$

by way of the multipliers 89 and 90 as well as the adding, subtracting arrangement 91 by using the magnitude $r_m$, $k_{m+1}$ and $a_m r_m$ as well as the constants $c$ and $d$ and is directed to the store 92 so that for the iteration $m+1$ the value $r_{m+1}$ is available.

The constant c must be in the area $0<c\leq 1$. For the optimum setting speed, the most favorable value depends on the type and statistics of the signals to be transmitted and is, for speech approximately $c=0.8$ and for digital signals or white noise, respectively, $c=1$. The constant $d$ must be $d\geq 0$. For circuits not containing non-synchronous carrier systems where is no frequency shift between the incoming signal $x$ and the echo signal y arriving by way of the branch connection does not occur, the value for $d$ may be very small, for example $d=0.0001$. In case of possible small frequency shift between the signals $x$ and 6, in case of non-synchronous carrier systems between the echo canceller and the respective branch connection, the dimensioning of the value d should be approximately $d=0.01$.

At the beginning of a telephone call and the beginning of the iteration ($m=0$) the initial values $S_o$, $r_o$ must be determined, since these are required for the initiation of the iteration. Since at the activation of the echo canceller the gain element values $c_i$ are set to zero in the gain elements 61 . . . 69, and therefore only the echo attenuation of the hybrid 3 is available, but is not known, the value $r_o$ must be adjusted to a medium echo attenuation of the hybrid. For example, the value $r_o$ = 0.5 is to be assigned to the echo attenuation value GD = 6 *dB*. As an initial value $S_o$ (estimated value of the medium power of the near-end signal *n*) the value $S_o$ = 0 can be chosen, since at the beginning of the telephone call in most cases either only the near-end duplex signal *n* or only the input signal *x* is applied at the echo canceller. If only the signal *x* is available, the estimate $S_o = 0$ is correct. If only the signal n is available, the estimate $S_o = 0$ is incorrect, but it does not influence the setting of the canceller, since the setting of the gain elements 61 . . . 69 remains unchanged when the input signal *x* disappears. After several sounds of the near-end signal *n*, however, a value S has already built up which can be used when the input signal *x* is applied.

Figure 3:
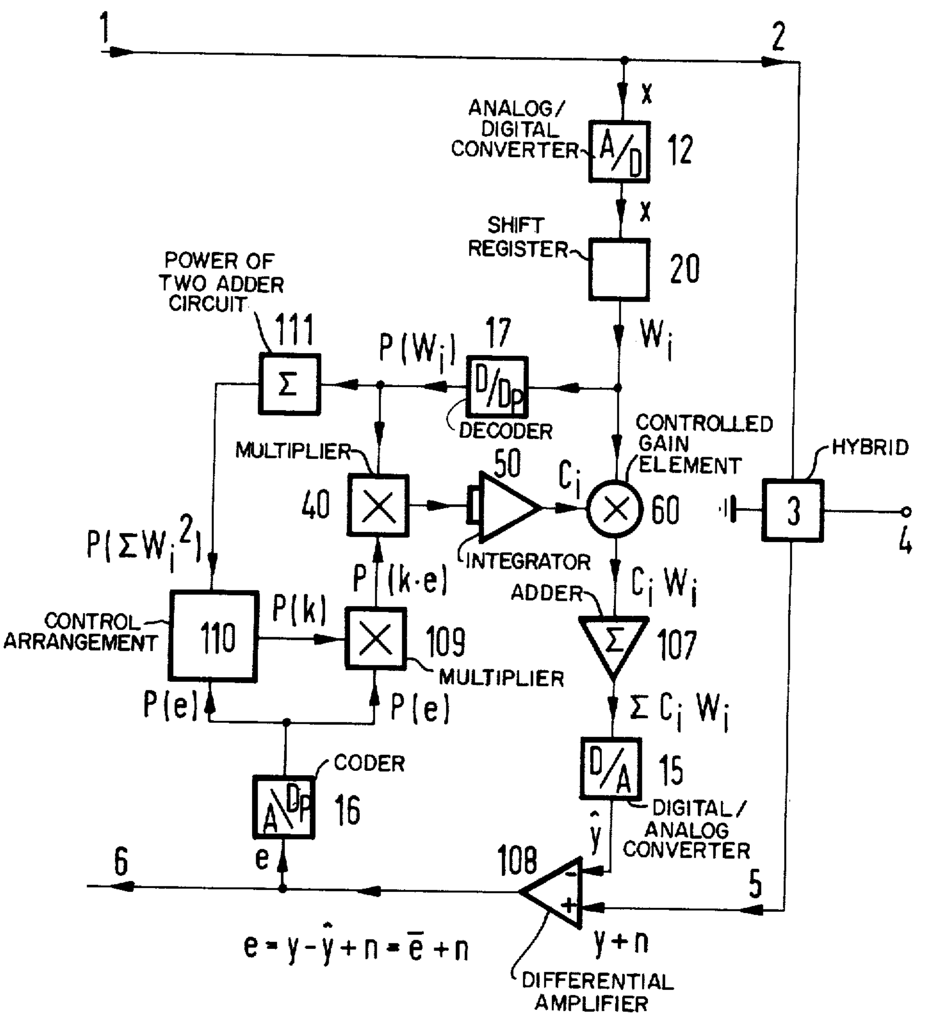
FIG. 3 is a schematic diagram of a further exemplary embodiment of an echo canceller constructed in accordance with the invention.

FIG. 3 illustrates an exemplary embodiment of the echo canceller which is based on the arrangement according to FIG. 1, and it differs therefrom basically in that the branch network 21 . . . 29 is realized by a shift register which releases its output signals $w_i$ digitally and sequentially in time (for example N = 256) as a multiplex signal from which the simulated echo signals $\hat{y}$ is digitally created by means of the gain element 60 (instead of the gain elements 61 . . . 69) and the adder 107 (instead of the adder 7) on a time multiplex basis.

Furthermore, the multipliers 41 . . . 49 are replaced by the multiplier 40, the integrators 51 . . . 59 are replaced by the integrator 50 and the amplifier 9 is replaced by the multiplier 109, whereby the realization of the multiplier 40 and the multiplier 109 takes place with very fast four bit adders because of the utilization of a power of two code which will be described in detail below. Finally, the squarers 31 . . . 39 and the adder 11 are replaced by the arrangement 111 (which is illustrated in greater detail in FIG. 4) and the control arrangement 10 is replaced by the arrangement referenced 110. The individual components and adjusting means can therefore be realized with comparatively little effort and expenditure and can achieve a high operational speed.

The analog/digital converter 12 according to FIG. 3 corresponds to the converter of the arrangement according to FIG. 1, having the same designation and codes as the analog input signal *x* of the incoming direction with a comparatively very fine quantization of, for example, twelve bit per sampling value. The sampling period T may be determined, corresponding to a band width limitation of the analog signal to 4 kHz, to T = 125 μs.

The differential amplifier 108 of the circuit according to FIG. 3 operates contrary to the differential amplifier 8 of the arrangement according to FIG. 1, purely in an analog manner. The digital/analog converter 15 is connected between the (inverting) input of the differential amplifier 108 and the adder 107 whereby the digital/analog converter has the same fine quantization as the analog/digital converter 12 so that a very good echo suppression in the analog operating differential amplifier 108 can be achieved.

The signal *e* in the outgoing direction 6 is directed to the multiplier 109 and the control arrangement 110 by way of the coder 16 as the signal P (*e*) which is converted in the power-of-two code. Using this power-of-two code, a quantization with four bits is sufficient for the special case of application without adversely effecting thereby the settling behavior of the echo canceller. The coder 16 will be explained in greater detail with reference to FIG. 5 later on.

The decoder 17 is connected between the arrangement 111 and the multiplier 40 on the one hand and the output of the branch network 20 designed as a shift register on the other hand. The decoder transforms the signal $w_i$ into the signal P ($w_i$) in accordance with the power of two code, which under the given circumstances is again sufficiently accurately quantized with four bits.

Figure 2:
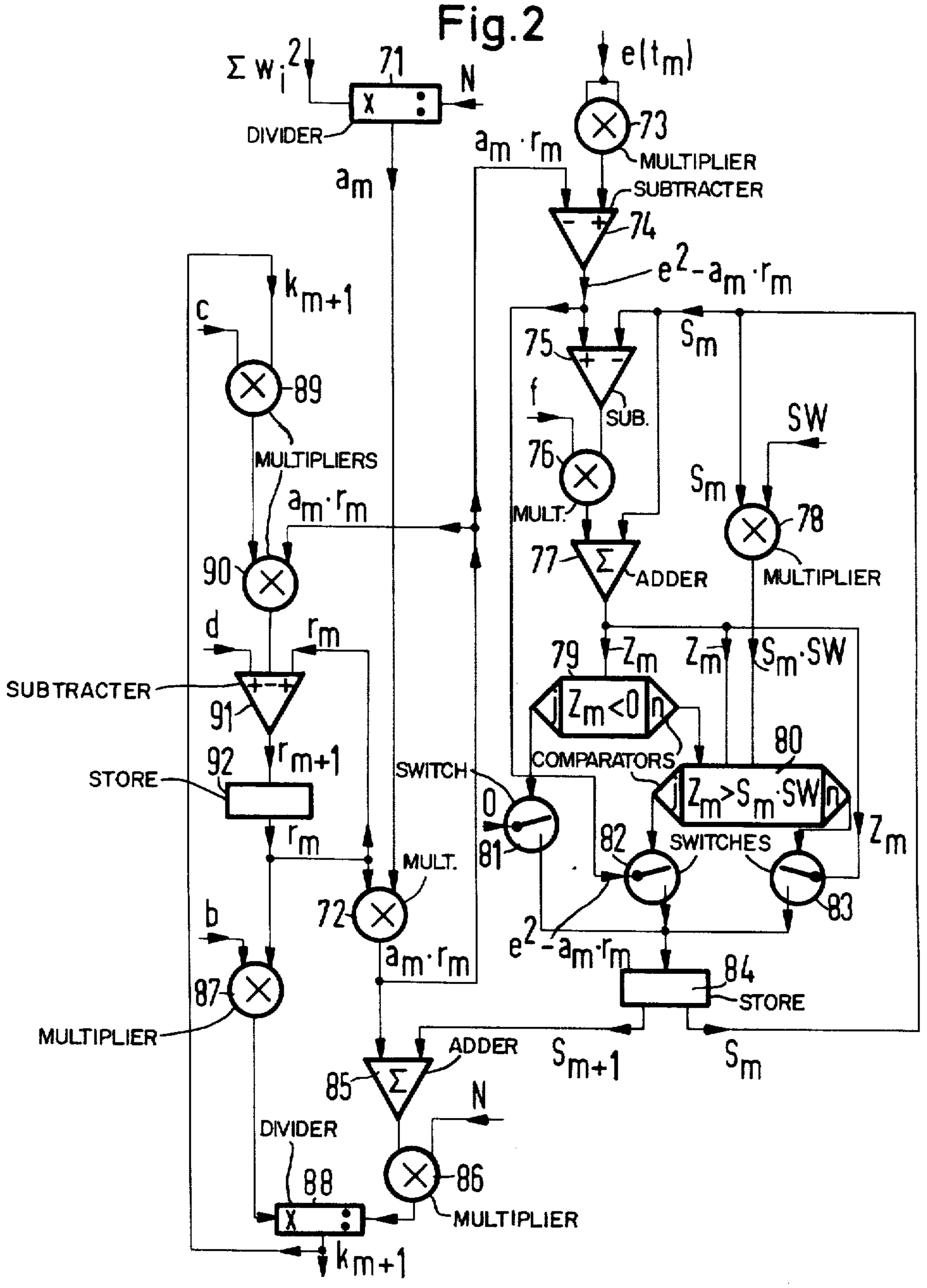
FIG. 2 is a diagram which illustrates the method of determining an evaluation factor from the remaining echo signal and the sum of the square output signals of a branch network.

As was previously mentioned, the multiplier 40 and the multiplier 109 can very easily be realized as fast four bit adders with the application of the power of two code; however, also the arrangement 111 and above all the control arrangement 110 which corresponds to the diagram according to FIG. 2 must carry out a multitude of multiplications and divisions and can be simplified considerably since in the power of two code each multiplication can be converted into an addition and each division into a subtraction. If, for example, the magnitudes $A_j$ ($j = 1, 2, \ldots m$) are to be multiplied with each other, the magnitudes $A_j$ are assigned according to the rule

| Digital Value of $A_j$ | Value In The Power-of-Two Code $P_j$ ($A_j$) |
|---|---|
| $2^0 \geq \lvert A_j \rvert > 2^{-1}$ | 0 |
| $2^{-1} \geq \lvert A_j \rvert > 2^{-2}$ | 1 |
| $2^{-2} \geq \lvert A_j \rvert > 2^{-3}$ | 2 |
| . | . |
| . | . |
| . | . |

of the power-of-two coded magnitudes $P_j$.

The summation result $$P = \sum_{j=1}^{m} P_j$$

is power-of-two decoded according to the rule

| Value of the Power-of-Two Code P ($A_1 \cdot A_2 \ldots A_m$) | Digital Value $[A_1 \cdot A_2 \ldots A_m]_q$ |
|---|---|
| 0 | $2^0$ |
| 1 | $2^{-1}$ |
| 2 | $2^{-2}$ |
| . | . |
| . | . |
| . | . |

whereby a roughly quantized approximate value $[A_1 \cdot A_2 \ldots \cdot A_m]_q$ is achieved for the product $A_1 A_2 \ldots A_m$.

Likewise a division can be realized through subtraction with the power-of-two code. If, for example, a division $A_1/A_2$ is to be carried out, at first the values $P_1$ ($A_1$), $P_2$ ($A_2$) are formed and afterward the subtraction $P = P_1 - P_2$ is decoded into a quantized value $[A_1/A_2]q$.

Figure 4:
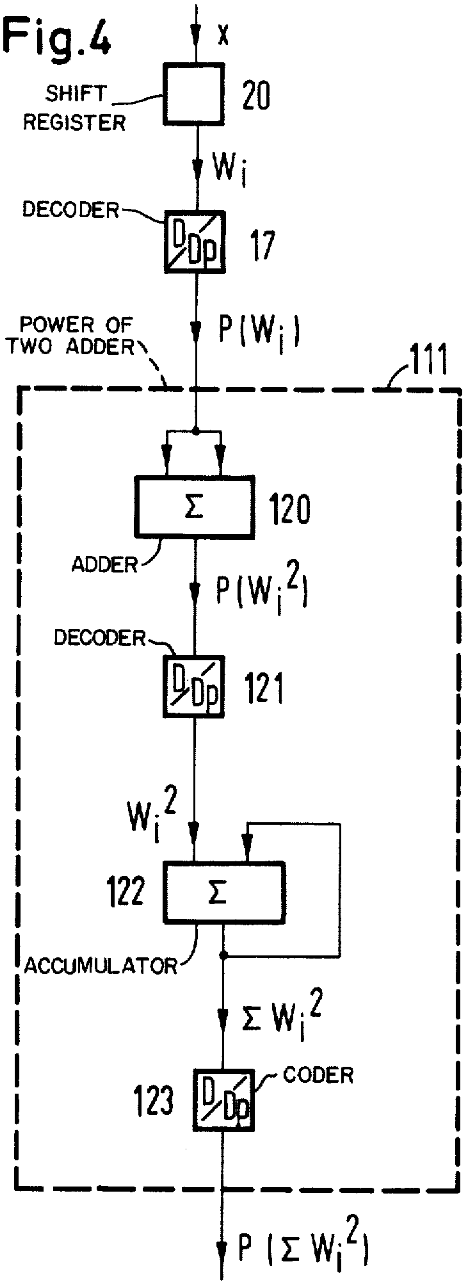
FIG. 4 is a schematic diagram showing the utilization containing an adder, a decoder, an accumulator and an encoder which may be employed in practicing the present invention.

The application of the previously described power-of-two code to the functional units of the echo canceller will be described below as an example in the embodiment of the arrangement 111 which is illustrated in detail in FIG. 4. The signal P ($w_i$) which is power-of-two coded with four bits is directed to the arrangement 111 by the coder 17 for creating the power-of-two coded signal $$P(\Sigma w_i^2).$$

For this purpose, the arrangement 111 contains the adder 120, the decoder 121, the accumulator 122 and the coder 123.

The adder 120 multiplies the signal P $(w_i)$ by means of the structure illustrated in FIG. 2, so that under consideration of the power-of-two code it carries out the function of a squarer so that the signal P $(w_i^2)$ is created. The adder 120 therefore corresponds to the squarers 31 . . . 39 illustrated in FIG. 1. For the purpose of adding, the signal P $(w_i^2)$ is decoded by the decoder 121 into a signal $w_i^2$ which is decoded linearly with nine bits and is subsequently added by the accumulator 122 to the signal $$\Sigma w_i^2.$$

The accumulator 122 therefore corresponds to the adder 111 in FIG. 1. Finally, the coder 123 creates the signal $$P(\Sigma w_i^2)$$

which is power-of-two coded with four bits.

Figure 5:
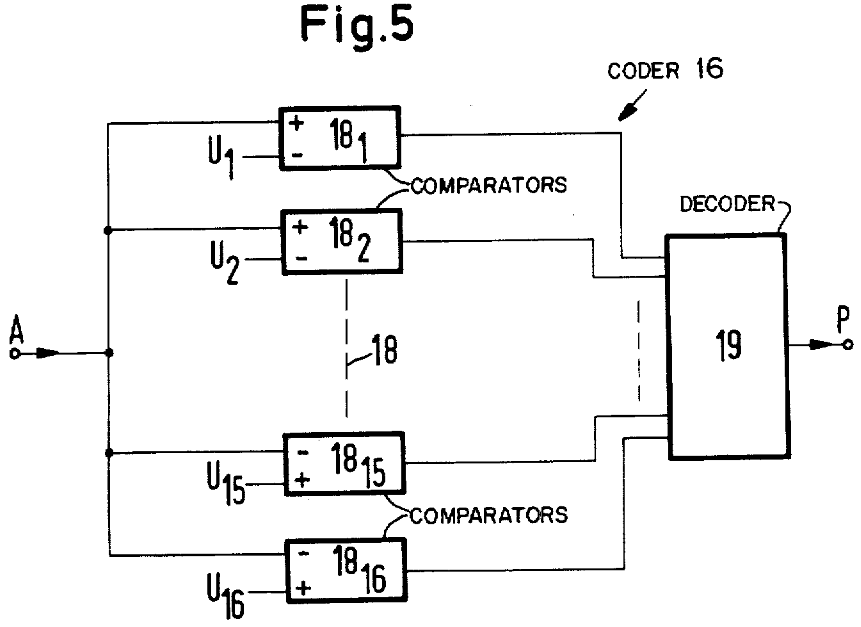
FIG. 5 is a schematic diagram of a plurality of comparators and a decoder which provides a power-of-two code for use in practicing the present invention.

The detailed embodiment of the coder will be explained in the following paragraphs by means of the coder 16 which is illustrated in FIG. 5. Preferably, the coder 16 should be designed as a fast parallel converter, as is known for example from the article by H. Schmid in the Periodical "Electronic Design", 26, Dec. 19, 1968, pages 57 to 76 under the title "An Electronic Design Practical Guide To A/D Conversion, Part 2". The coder consist of parallel connected comparators 18 which are referenced individually $\mathbf{18_1}$ . . . $\mathbf{18_{16}}$. The analog signal which is applied at the input A is distributed in parallel form to one input of each of the comparators 18. The other input of the comparators 18 is supplied with reference voltages $U_1$, $U_2$ . . . $U_{16}$ and the value "0" or "1" appears at the output of the comparators depending on whether the input voltages are larger or smaller than the reference voltages. The values which are provided by the comparators are directed to a controlled decoder 19 at which output a digital word in the power of two code appears.

Figure 6:
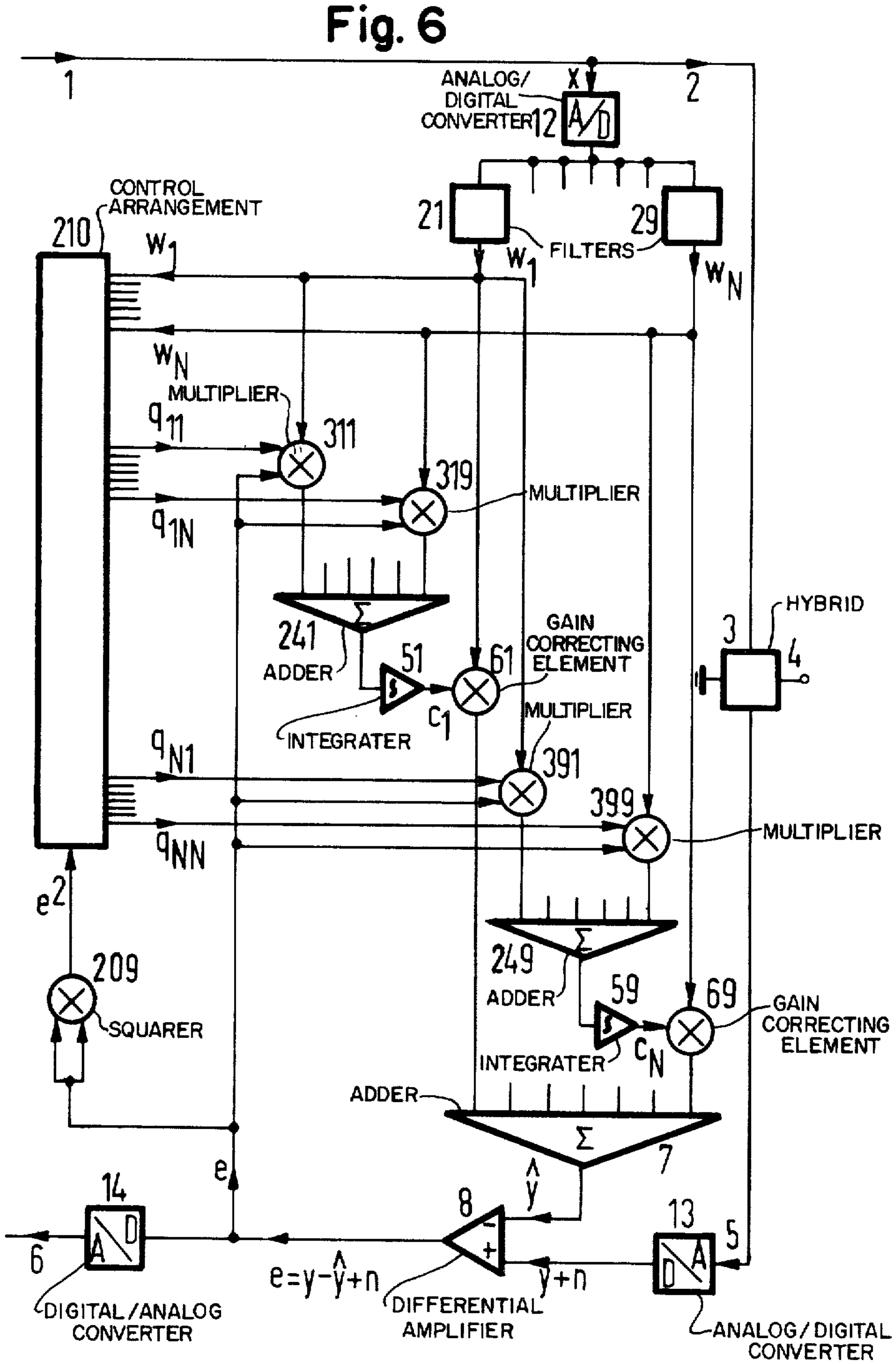
FIG. 6 is a schematic diagram of another embodiment of an echo canceller constructed in accordance with the principles of the present invention.

FIG. 6 illustrates the second embodiment of the echo canceller according to the invention within a long distance telephone connection, illustrated in a section such as illustrated in FIG. 1. The adaptive four-pole circuit of the echo canceller comprising the filters 21 . . . 29, the gain elements 61 . . . 69 and the adder 7 as well as the differential amplifier 8 and the converters 12, 13 and 14, correspond in their arrangement and effectiveness to the elements of the arrangement according to FIG. 1 which carry the same designations.

The adjustment of the amplification $c_1$ . . . $c_N$ of the gain element 61 . . . 69 always takes place by the output signal of a respective adder 241 . . . 249, which is integrated by way of a respective integrator 51 . . . 59, whereby the adder always forms part of a multiplying arrangement with one of the multipliers 311 . . . 319 or 391 . . . 399, respectively.

In case of the embodiment of the echo canceller according to FIG. 6, the respective regulated quantity or amplification $c_1$ of the respective individual gain elements 61 . . . 69 is not only adjusted by means of the respective output signals $w_i$ of the branch network 21 . . . 29, but always all or at least several of the output signals $w_1$ . . . $w_N$ of the branch network influence the individual regulated quantities $c_1$ . . . $c_N$.

Furthermore, all N multiplier arrangements (of which, however, only the first and the Nth arrangement are illustrated) again receive as large an amount N of multipliers as outputs of the branch network 21 . . . 29 are provided. These multipliers 311 . . . 319 or 391 . . . 399 respectively multiply the corresponding output signal $w_i$ of the branch network with the remaining echo signal $e$ in the outgoing direction of the four-wire path and with a weighting factor $q_{ik}$. Thereby, the first multiplier 311 of the first multiplying arrangement receives the signal with the weighting factor $q_{11}$, the N multiplier 319 of the first multiplying arrangement with the weighting factor $q_{1N}$ and further the first multiplier 319 of the N multiplier arrrangement the signal with the weighting factor $q_{N1}$ until finally to the N multiplier 399 of the N multiplying arrangement receives the signal with the weighting factor $q_{NN}$.

The signals of the above described weighting factor $q_{ik}$ $(i = 1, 2, \ldots N; k = 1, 2, \ldots N)$ which may be arranged in a square matrix Q are created by the control arrangement 210 which is supplied with the output signal $w_1$ . . . $w_N$ of the branch network 21 . . . 29 and which receives the squared remaining echo signal $e^2$ by way of the squarer 209 at the output of the differential amplifier 8. According to the rules for the implementation of the weight factors $q_{ik}$ which will be described later on, it results that $q_{ik} = q_{ki}$.

The control arrangement 210 forms the weight factors $q_{ik}$ dependent on the squared remaining echo $e^2$ and the output signals $w_1$ . . . $w_N$ of the branch network in such a way that the evaluation of the remaining echo signal $e^2$ normally accepts a maximum value and that this weighting is lowered more in case of the occurrence of interfering noise n in the outgoing direction of the four-wire path 5, 6 the larger the interfering noise n and the better the already achieved setting accuracy of the correcting elements 61 . . . 69. Interfering noise n can be constituted, for example, by speech signals of the near subscriber connected to the two-wire path 4, and also signals of a data transmission originating from the near subscriber connected to the two-wire path 4.

The foregoing explanation referred to an operational mode of the echo canceller with purely analog signals for an easier understanding of the invention. Actually, however, the exemplary embodiment sets forth an echo canceller operating with digital signals and thus receiving the signal $x$ by way of the analog/digital converter 12 from the incoming direction 1, 2. Furthermore, the signals $y + n$ of the outgoing direction 5 reach the differential amplifier 8 by way of the analog/digital converter 13 whereby the output signal of the differential amplifier 8 (the remaining echo signal $e$) leaves in the outgoing direction 6 by way of the digital/analog converter 14. For the purpose of this digital mode of operation, the branch circuit 21 . . . 29 may be realized, for example, as a shift register. The control arrangement 210 processes sampled values $w_i$ $(t_m)$ as well as the sampled values $e$ $(t_m)$ sampled at pulse times $t_m$ $(m = 0, 1, 2 \ldots)$ in iteration steps m according to the algorithm which will be described below and is a special case of the Kalman filter algorithm into the weighting factors $q_{ik}$ whereby $$i = 1, 2, \ldots N; k = 1, 2, \ldots N.$$

The Kalman filter algorithm is set forth in detail in the publication by R. E. Kalman "A New Approach to Linear Filtering And Prediction Problems", Transactions of the ASME, Series D, Journal of Basic Engineering, March 1960, Pages 35 to 45.

The method according to which the control arrangement 210, being designed as an arithmetic unit, operates is based on the following principles:

The vector W is formed by the signals $w_1 \ldots w_N$ at $$W^T = (w_1 \ldots w_N), \ (T \triangleq \text{transposed}).$$

The quadratic N × N matrix A is formed into $$A = W \cdot W^T$$

As an auxiliary quantity, the N × N matrix P occurs in the following algorithm whereby its elements $P_{11} \ldots P_{NN}$ constitute a measurement for the setting accuracy of the gain elements 61 . . . 69 already achieved. In addition, the scalar quantity S is introduced and its value $S_m$ constitutes the measurement for the average power of the interfering signal n which was obtained in the previous iteration $m - 1$. The quantity Z constitutes an estimated power of the interfering signal $n$ which is averaged over several steps whereby the number of steps over which $Z_m$ is averaged can be determined by the constant $f$. Preferably, the constant $f$ is selected to be approximately 0.2 corresponding to an average of $Z_m$ over five steps; however, the constant f can be basically freely selected within the range $0<f \leq 1$. The quantity SW is a threshold value and is selected to be larger than 1.

For the determination of the matrix Q for the weighting factors $q_{11} \ldots q_{NN}$ the algorithm with the index $m$ as the number of iterations is as follows:

$$Z_m = S_m + f[e^2(t_m) - Sp\,(A_m\,P_m) - S_m],\ 0<f \leq 1$$

$$S_{m+1} = \begin{cases} O & \text{for } Z_m < O \\ e^2(t_m) - Sp(A_m\,P_m) & \text{for } Z_m > SW \cdot S_m,\ SW>1 \\ Z_m & \text{usual} \end{cases}$$

$$P_{m+1} = P_m - (P_m\,A_m\,P_m) \,/\, (W_m^T\,P_m\,W_m + S_{m+1})$$
$$Q_{m+1} = P_m \,/\, (W_m^T\,P_m\,W_m + S_{m+1})$$

The above used operator $Sp$ ($Sp$ = trace), applied to any N × N-Matrix $R = (r_{ik})$ is defined by $$Sp\,R = \sum_{i=1}^{N} r_{ii}$$

which is a trace of a matrix which constitutes the total of its diagonal elements.

At the beginning of the iteration ($m = 0$) an initial value $S_o \geq 0$ must be determined which may be favorably fixed at $S_o = 0.1$. In addition initial values must be determined for the coefficients $P_{11} \ldots P_{NN}$ of the matrix $P_o$ which also must be elected according to the relation $p_{ii}<0$ and should preferably be fixed at $P_{ii} = 1/N$. The nondiagonal elements $p_{ik}$ ($i \neq k$) may be constituted, for example, by $p_{ik} = 0$.

Finally, the algorithm for determination of the vector C, formed by the regulated output $c_1 \ldots c_N$ is as follows:

$$C_{m+1} = C_m + e(t_m) \cdot Q_{m+1} \cdot W_m$$

The implementation of the steps of the procedure for the determination of the gain element values $c_1 \ldots c_N$ occurs in the above described exemplary embodiment, basically by the multipliers 311 . . . 319, . . . , 391 . . . 399. The respective steps, however, may also be carried out by the control arrangement 210 in an echo canceller which does not contain the multipliers 311 . . . 399, the adders 241 . . . 249 and the integrators 51 . . . 59.

Although I have described my invention by reference to specific illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An echo canceller for a long-distance telephone circuit comprising a four-wire circuit including an incoming path and an outgoing path and a hybrid, said echo canceller comprising a branch network connected to the incoming path of the four-wire circuit and having a plurality of outputs, said branch network corresponding to systems having linear independent pulse responses operable to provide a plurality of output signals, an adder, a plurality of adjustable gain elements connected between said outputs and said adder, said adder providing a simulated echo signal, subtracting means in the outgoing path connected to said hybrid and to the output of said adder for subtracting the simulated echo signal from the echo signal in the outgoing path to provide a remaining echo signal, squaring means for squaring said output signals, summing means connected to said squaring means for summing the squared signals, a control arrangement connected to the output of said subtracting means and to the output of said summing means for providing a weighting factor from the remaining echo signal and the sum of the squared signals, a controllable element connected to said subtracting means and to said control arrangement for multiplying the remaining echo signal by the weighting factor, multipliers including inputs connected to said branch network outputs and to said controllable element and outputs connected to said adjustable gain elements for multiplying the respective output signals with the weighted remaining echo signal, said control arrangement operable to decrease the weighting factor from a maximum value the greater the interference and the more accurately the adjustable gain elements have been set.

2. An echo canceller according to claim 1, wherein said branch network is a digital network and operates to release said output signals on a time multiplex basis and wherein said control arrangement provides the weighting factor in a power-of-two code.

* * * * *